Oct. 4, 1960 H. J. WHITE 2,955,006
EGG STORAGE MEANS FOR REFRIGERATORS
Filed Sept. 15, 1958 2 Sheets-Sheet 1
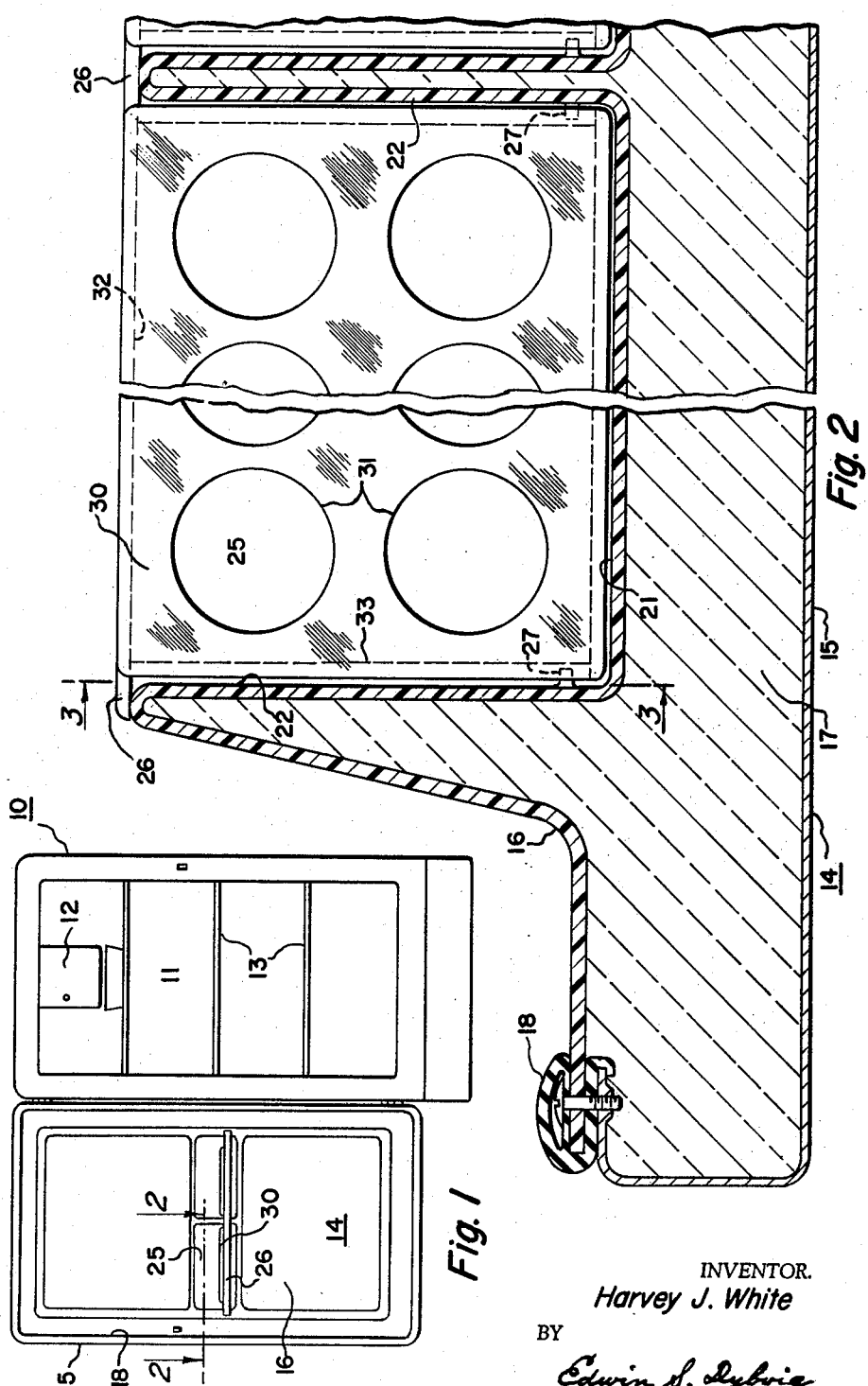
INVENTOR.
Harvey J. White
BY
Edwin S. Dybvig
His Attorney Oct. 4, 1960  H. J. WHITE  2,955,006
EGG STORAGE MEANS FOR REFRIGERATORS
Filed Sept. 15, 1958  2 Sheets-Sheet 2

INVENTOR.
Harvey J. White
BY
Edwin S. Dybvig.
His Attorney

# United States Patent Office 2,955,006
Patented Oct. 4, 1960

2,955,006

EGG STORAGE MEANS FOR REFRIGERATORS

Harvey J. White, Birmingham, Mich., assignor to General Motors Corporation, Detroit, Mich., a corporation of Delaware Filed Sept. 15, 1958, Ser. No. 761,093

2 Claims. (Cl. 312—214)

This invention relates to an egg storage arrangement particularly adaptable for use in household refrigerators.

The present invention lies in an egg storage arrangement for a refrigerator cabinet and has novel and useful characteristics whereby eggs are stored in segregated fashion to afford safety from breakage while maintained at a proper temperature in the refrigerator. More specifically the invention relates to an egg storage tray or rack used in combination with a compartment in a refrigerated chamber of a refrigerator cabinet or a recess provided in the door of a refrigerator cabinet and having a food product supporting shelf therebelow which is normally obstructed by the egg rack and unusable for this purpose and is rendered capable for such use by adjustability of the rack within the compartment or recess. I am aware that others have provided egg racks or trays associated with food product supporting shelves in refrigerators and have made the egg rack detachable or removable from a refrigerator cabinet so as to enable the shelf to be used for the support of food products when eggs are not desired to be stored in or on the egg rack or tray. The egg rack or tray upon being removed from the refrigerator is usually placed in a kitchen cupboard or cabinet drawer until it is thereafter again needed for the storage of eggs in the refrigerator. A housewife too frequently forgets where she placed or stored the egg rack or tray after removing it from the refrigerator and this causes considerable confusion and loss of time in attempting to find it when use of the rack or tray is again desired. As a result the housewife is likely to store eggs in other than a proper location therefor in the refrigerator whereby the eggs are subjected to breakage. For this reason I contemplate the provision in a recess in a refrigerator cabinet door or in a compartment within a refrigerated chamber in the refrigerator of an egg storage rack in cooperation or conjunction with a food supporting shelf in the recess or compartment which rack normally obstructs and prevents the use of the shelf for supporting food products and is, when not employed for storing eggs thereon, shiftable or swingable to the rear of the recess or compartment whereby to substantially clear the shelf and render same capable of receiving and supporting food products thereon without necessitating detachment and removal of the egg rack from the refrigerator cabinet. In this manner the egg rack is at all times retained in the refrigerator and is readily available at its proper or ordinary location therein for storage of eggs thereon so as to eliminate misplacing same and to save time when it is desired to be used.

A general object of my invention is to provide a compartment preferably in the inner face of a door of a refrigerator cabinet of such construction as to form a food product supporting shelf and to contain an egg storage rack above the shelf which rack is shiftable within the compartment with respect to the shelf into an out-of-the-way position therein relative to the shelf whereby food products may be received by and supported on the shelf when use of the egg rack is not desired or required.

Another object and purpose of my invention is to provide a compartment in a refrigerated chamber of a refrigerator cabinet with a food supporting shelf-like bottom wall and an egg storage rack associated therewith which rack is shiftable within the compartment into an upright supported position adjacent and substantially parallel to the compartment rear wall for rendering the shelf-like compartment wall capable of receiving and supporting food products thereon while the egg rack remains in its shifted position in the compartment.

A still further and more specific object of my invention is to provide an egg storing rack above a food supporting shelf-like bottom wall of a compartment in a refrigerator which rack is shiftable within the compartment to render the shelf-like compartment wall usable and to hold the rack in its shifted position so that it is readily accessible in the compartment and adjustable therein for returning it to an egg receiving storage position.

Further objects and advantages of the present invention will be apparent from the following description, reference being had to the accompanying drawings, wherein a preferred form of the present invention is clearly shown.

In the drawings:

Figure 1 is a front view of a household refrigerator cabinet with its food chamber door shown in open position and illustrating the incorporation in the door of an egg storage compartment embodying the feature of the present invention.

Figure 2 is an enlarged horizontal broken sectional view taken on the line 2—2 of Figure 1 showing a rack supported in an egg receiving position in the egg storage compartment;

Figure 3:
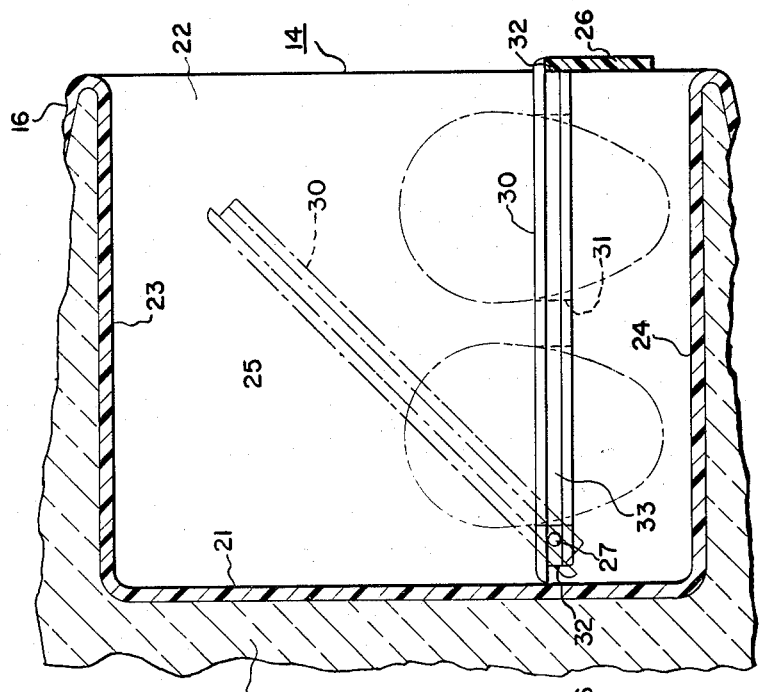
Figure 4:
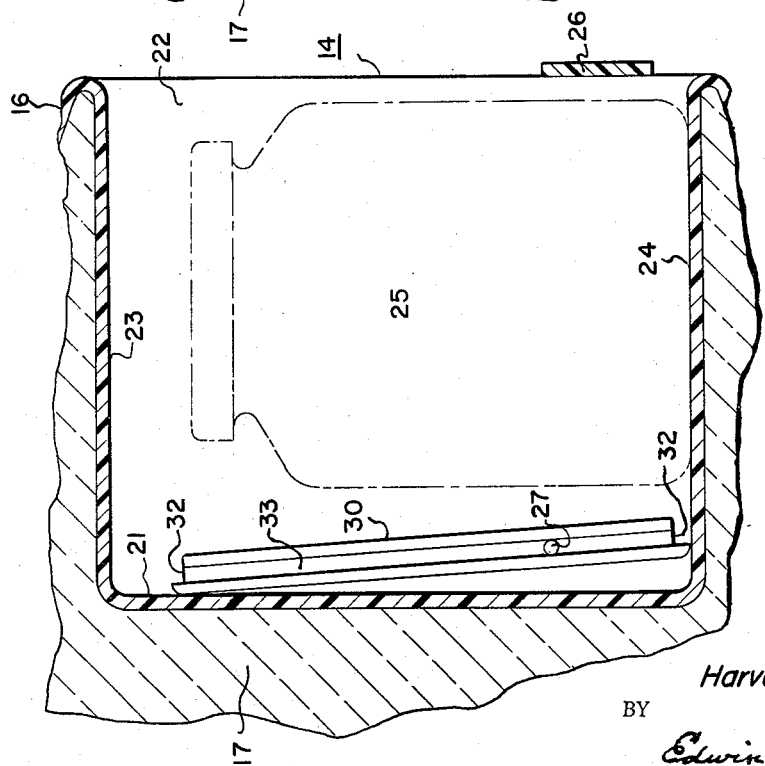

Figure 3 is a fragmentary vertical sectional view taken on the line 3—3 of Figure 2 showing the supporting means for the egg rack; and Figure 4 is a view generally similar to Figure 3 with the egg rack shown unusable for storage of eggs and shifted within the compartment into a position adjacent its rear wall to render the shelf-like bottom wall of the compartment capable of receiving and supporting food products thereon.

Referring to the drawing, for illustrating my invention, I show in Figure 1 thereof a household refrigerator cabinet member 10 having a main insulated food storage chamber 11 therein adapted to be refrigerated or cooled by an evaporator 12 of a closed refrigerating system (not shown) associated with the cabinet member as is conventional in the art. Chamber 11 contains a plurality of vertically spaced apart shelves 13 as is usual in refrigerator cabinets. The access opening of chamber 11 is normally closed by an insulated door structure or member generally represented by the reference numeral 14 shown in open position in Figure 1 to illustrate the preferred location of an egg storage compartment or arrangement as herein contemplated. The door member or structure 14 is hingedly mounted upon cabinet member 10 for horizontal swinging movement relative thereto. Door member 14 includes an outer metal pan-like element 15 (see Figure 2) and an inner molded plastic panel 16 suitably secured thereto with insulating material 17 disposed therebetween (see Figures 2 and 3). A resilient gasket 18 is located between edges of panel 16 and the metal door pan element 15 in any suitable or conventional manner for engaging the front of cabinet member 10 to seal chamber 11. At least a portion of the inner molded plastic door panel 16 is dished inwardly toward pan element 15 and forms means providing a rear wall 21, opposed side walls 22, a top wall 23 and a shelf-like bottom wall 24 of one or more recesses or recessed compartments 25 in the inner face of door 14 (see Figures 2 and 3). Shelf-like bottom wall 24 of recesses or compartments 25 constitutes or provides a support or shelf on door 14 adapted to receive food products thereon as will be hereinafter explained. The compartment 25 communicates with or is exposed to cool air in chamber 11 when door 14 is closed so as to chill the contents thereof. A guard rail 26, cemented or secured in any suitable or conventional manner to door panel 16 at the forward edge portion of side walls 22, extends across the front of compartment 25 above its bottom wall or shelf 24 and prevents food products placed on this compartment shelf-like wall from sliding off same during opening and closing movements of door 14. A lug, stud or pin means 27 secured to or formed integral on door panel 16 extends from each of the opposed side walls 22 of compartment 25 and projects a short distance into this compartment for a purpose to become apparent hereinafter. A generally flat rectangularly shaped tray or rack 30, provided with a plurality of egg receiving means or openings 31 therein (see Figure 2), has an upper surface which, by virtue of shoulders 32 cut or formed in its long sides, overlies a shorter lower surface thereof (see Figure 3). Egg rack 30 may if desired be made of metal or it may and is preferably formed of molded plastic material. The ends of rack 30 are grooved out as at 33 to provide track means thereon extending at least part way thereacross and to facilitate manufacture thereof the grooves or track means 33 extend entirely across ends of the rack.

The egg rack with which my present invention is particularly concerned is, when used to store eggs, supported in a substantially horizontal plane within the recess or recessed compartment 25 spaced above the shelf-like bottom of shelf 24 thereof. For example the end portion of rack 30 adjacent rear shoulder 32 rests on the two opposed lugs or pin means 27 and its front side or edge adjacent the other or forward shoulder 32 rests on guard rail 26. The rack 30 is in this manner nested between lug means 27 and rail 26 (see Figure 3) and prevented from shifting relative thereto upon opening and closing movements of door member 14 to store a plurality of eggs in spaced apart segregated fashion in compartment 25 on the refrigerator door. In the event that a housewife desires to detach rack 30 from door 14 the front edge side thereof can be raised upwardly of guard rail 26, slid off the lug or pin means 27 and removed from compartment 25 through its open front above the rail. This in addition to permitting the rack together with eggs thereon to be transported to a work ledge in the vicinity of a cooking range also facilitates cleaning of walls of compartment 25. The egg rack 30 when supported in compartment 25 as described normally forms an obstruction over shelf 24 and prevents the placing of food products on the shelf-like compartment bottom wall. However in the event there are no eggs to be stored on the egg rack and it is desired to utilize the shelf-like compartment bottom wall or shelf 24 to support food products thereon it is unnecessary to detach or remove rack 30 from door 14. In such event the front side of rack 30 is tilted or swung upwardly, while its rear portion is supported on or pivots about the lug means 27 as shown by dot-dash lines in Figure 3, and then upon pushing the rack downwardly in the compartment groove 33 receives the lug means whereupon the track means on rack 30, formed by this groove, is slid along the lug means to locate the rack in an upright supported position adjacent to and substantially parallel with the rear wall 21 of compartment 25 (see Figure 4). The obstruction to shelf 24 is shifted to an out-of-the-way location in compartment 25 without removing rack 30 therefrom and shelf 24 is thereby rendered capable of receiving and supporting food products such as short jelly or jam containing jars or the like thereon as indicated by the dot-dash line showing in Figure 4 of the drawings. By this arrangement compartment 25 is rendered usable selectively and while the rack is located therein to support eggs on an egg rack for storage in the refrigerated chamber of the refrigerator or to receive and support on shelf 24 food products when the rack 30 is not used. It is to be noted that the opposed lug means 27 cooperate with the track portions, grooves 33, on egg rack 30 and with walls of compartment 25 to hold or lock the rack in its upright shifted position against moving relative to the door panel during opening and closing movements of door member 14. When it is desired to again use the rack for storage of eggs in compartment 25, instead of supporting other food products on shelf 24, rack 30 is raised away from the compartment bottom wall and swung forwardly and downwardly in the compartment to support same in a nested fashion on lug means 27 and guard rail 26. While I have preferred to illustrate my invention in connection with a compartment recessed in the inner face of panel 16 of door member 14 it is to be understood that such a compartment may, if desired, be provided by other means within the main food storage chamber 11 of cabinet member 10.

It should, in view of the foregoing, be apparent that I have provided an improved and unique article storing arrangement for use particularly in refrigerator cabinets. By my novel arrangement disclosed it is unnecessary to detach an egg rack from a storage compartment or to remove same from a refrigerator cabinet when the shelf or shelf means with which it is associated is to be used for the storage of other food products. Such is accomplished by utilizing a generally flat egg rack which occupies a minimum of space and is adjustable or shiftable within a storage compartment. By my innovation confusion and embarrassment in searching for an egg rack removed from a refrigerator and stored in a place remote therefrom is eliminated and my present disclosed storage arrangement results in a great saving of time to a housewife or user of a refrigerator cabinet equipped with such an arrangement.

While the form of embodiment of the invention as herein disclosed constitutes a preferred form, it is to be understood that other forms might be adopted, as may come within the scope of the claims which follow.

What is claimed is as follows:

1. In a refrigerator, a cabinet member having a refrigerated chamber therein provided with an access opening and a door member therefore secured to said cabinet for movement relative thereto, a shelf on one of said members exposed to cool air in said chamber, a generally flat one piece rack having track means along end edges thereof associated with said shelf, means for movably mounting said rack at its front and rear edges in a substantially horizontal plane over said shelf on said one member, said mounting means including a guard rail on said one member above the front portion of said shelf and opposed pins at opposite ends of said one member spaced above the rear portion of said shelf detachably interlocked in said track means on the end edges of said rack, said rack being provided with apertures adapted to receive a portion of each of a plurality of eggs placed therein to support them in segregated fashion within said chamber above said shelf, the disposition and proximity of said rack to said shelf normally obstructing and preventing placing of food products on the shelf, said egg rack being tiltable upwardly relative to said front rail to pivot same about said pins and shiftable downwardly into a substantially parallel position adjacent an upright wall portion of said one member with the front edge of said rack resting thereagainst and with the rear edge thereof supported on said shelf, said pins holding the rack in said shifted supported position on said shelf whereby to uncover the shelf and render same capable of receiving and storing food products thereon behind said guard rail, and said egg rack being removable from its mounting means by elevating the front edge of the rack with respect to said pins and swinging same away from the pins to detach said track means therefrom.

2. In a refrigerator, a cabinet having a refrigerated chamber therein provided with an access opening and a door therefor secured to said cabinet for movement relative thereto, a panel on said door formed to provide the rear wall, said walls, a top wall and a shelf-like bottom wall of a recess in the inner face of the door exposed to cool air in said chamber, a generally flat one piece rack having track means along end edges thereof associated with said recess, means for movably mounting said rack at the front and rear edges thereof within said recess in a substantially horizontal plane over said shelf-like recess bottom wall, said mounting means including a guard rail on said door panel above the front portion of said shelf-like recess bottom wall and opposed pins at opposite ends of the recess spaced above the rear portion of said shelf-like recess bottom wall detachably interlocked in said track means on the end edges of said rack, said rack being provided with apertures adapted to receive a portion of each of a plurality of eggs placed therein to support them in segregated fashion within said chamber above said shelf-like bottom wall of said recess, the disposition and proximity of said rack to said shelf-like recess bottom wall normally obstructing and preventing placing of food products on said wall, said egg rack being tiltable upwardly relative to said front rail to pivot same about said pins and shiftable downwardly into a substantially parallel position adjacent the rear wall of said recess with the front edge of said rack resting thereagainst and with the rear edge thereof supported on said shelf-like bottom wall of the recess, said pins holding the rack in said shifted supported position on said shelf-like recess bottom wall whereby to uncover and render same capable of receiving and storing food products thereon behind said guard rail, and said flat one piece egg rack being removable from its mounting means by elevating the front edge of the rack with respect to said pins and swinging same outwardly away from the pins to detach said track means therefrom.

References Cited in the file of this patent

UNITED STATES PATENTS

| | | |
|---|---|---|
| 291,030 | Clapper | Jan. 1, 1884 |
| 864,566 | Ronan | Aug. 27, 1907 |
| 1,111,422 | Warren | Sept. 22, 1914 |
| 1,856,935 | Turner | May 3, 1932 |
| 2,216,621 | Mackinga | Oct. 1, 1940 |
| 2,702,639 | Eck | Feb. 22, 1955 |
| 2,745,259 | Saunders | May 15, 1956 |